United States Patent [19]

Alburn

[11] 3,829,576

[45] Aug. 13, 1974

[54] METHOD OF TREATING NEISSERIA GONORRHOEAE WITH DIHYDROAMPICILLIN

[75] Inventor: Harvey E. Alburn, West Chester, Pa.

[73] Assignee: American Home Products Corporation, New York, N.Y.

[22] Filed: Aug. 26, 1971

[21] Appl. No.: 175,337

Related U.S. Application Data

[63] Continuation-in-part of Ser. No. 171,367, Aug. 12, 1971.

[52] U.S. Cl. ............................................... 424/271
[51] Int. Cl. ............................................. A61k 21/00
[58] Field of Search .................................. 424/271

[56] References Cited
UNITED STATES PATENTS
3,485,819   12/1969   Weisenborn ..................... 424/271

OTHER PUBLICATIONS

Gadebusch et al., 6–[D–z–Amino–2–(1,4–cyclohexadienyl) acetamido]–Penicillanic Acid, (SQ11,302) J, In Vitro Laboratory Studies, Oct. 21, 1970.

The Merck Manual of Diagnosis and Therapy, 11th edition, Merck & Co., Inc., 1966, pages 1455–1458.

*Primary Examiner*—Jerome D. Goldberg
*Attorney, Agent, or Firm*—Vito Victor Bellino; Stephen Venetianer

[57] ABSTRACT

A method for treating Neisseria infections is described using an effective amount of 6-[2-amino-2-(1,4-cyclohexadien-1-yl) acetamido]pencillanic acid.

1 Claim, No Drawings

METHOD OF TREATING NEISSERIA GONORRHOEAE WITH DIHYDROAMPICILLIN

This application is a continuation-in-part of copending application Ser. No. 171,367 (AHP-5606), filed Aug. 12, 1971 in the name of Alburn and Dvonch, and titled "Amidinoureido Cycloaliphatic Penicillins."

This invention relates to the treatment of Neisseria infections with 6-[2-amino-2-(1,4 cyclohexanedien-1-yl)acetamido] pencillanic acid.

The present invention provides for an effective treatment of Neisseria infections with a semi-synthetic penicillin which to date has shown greater effectiveness than ampicillin and penicillin G, the most widely used therapeutic agents in the treatment of *Neisseria gonorrhoeae*.

The penicillin useful in the method of the present invention has the structural formula

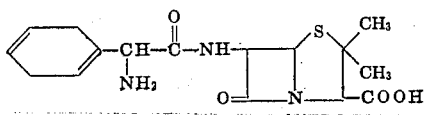

This compound's chemical name is 6-[2-amino-2-(1,4-cyclohexadien-1-yl)acetamido]penicillanic acid.

As will be understood by those skilled in the art, dihydroampicillin may be utilized in its acid form or in the form of the therapeutically active salts thereof, e.g., the sodium or potassium salts, or hydrochloride, sulfate, fumarate, etc., or in the form of the pharmaceutically acceptable, non-toxic salts prepared by the reaction of the penicillin compound with an amine or diamine base, e.g., procaine or various N-N'-disubstituted alkylene diamines, such as N,N'-dibenzylethylene-diamine, etc.

The $\alpha$-carbon atom of the penicillin side chain (to which the amino group is attached) of the compound of formula I is an asymmetric carbon atom and the substituent acids can therefore exist in two optically active isomeric forms [the D- and L- enantiomers], as well as the DL form which is a mixture of the two optically active forms; all such isomers are included with the compound defined by formula, I the preferred isomer being the D form. This preferred isomer for convenience of identification may be called dihydroampicillin. This compound is described in U.S. Pat. No. 3,485,819, the disclosure of which is incorporated herein by reference.

Dihydroampicillin is generally recovered in the form of its hydrate (i.e., mono, di, or trihydrate). If desired, it may be converted to the anhydrous form by procedures known in the art such as described in U.S. Pat. No. 3,144,445. Therefore, reference to dihydroampicillin is intended to embrace both the anhydrous and hydrated forms.

The following example is given to illustrate the preparation of dihydroamplicillin.

EXAMPLE
6-[D-2-amino-2-(1,4-cyclohexadien-1-yl)acetamido]penicillanic acid a. D-$\alpha$-amino-1,4-cyclohexadiene-1-acetic acid (3.97 g. 26 mM) is suspended in carbon tetrachloride (200 ml.), and the suspension chilled to 0°C. Phosphorous pentachloride (10.8 g., 52 mM) is added with stirring and the suspension is allowed to come to room temperature. After eighteen hrs. the product is filtered off, washed with ether, and dried over silica-gel, the product being identified as the acid chloride hydrochloride salt of D-$\alpha$-amino-1,4-cyclohexadiene-1-acetic acid.

b. 6-Aminopenicillanic acid (0.98 g., 4.6 mM) is suspended in water (25 ml.) and the pH is adjusted to 6.0 with sodium hydroxide. Aceton (50 ml.) is added, and the solution is chilled to 0°C. The acid chloride hydrochloride salt of D-$\alpha$-amino-1,4-cyclohexadiene-1-acetic acid (1.44 g., 6.0 mM) is added in ten portions over a thirty minute period. The pH is adjusted to 5.5 and the above titled penicillin isolated by isoelectric precipitation in a yield of 58 percent.

Dihydroampicillin has been found particularly effective against penicillin-resistant strains and penicillin-sensitive strains of *Neisseria gonorrhoeae*. The effectiveness of this compound was compared with that of ampicillin, penicillin G and tetrahydroampicillin. The latter compound is prepared as follows: 3.53 g. of dihydroampicillin is suspended in water (120 ml.) and dissolved by adjusting the pH to 8.5. This penicillin is hydrogenated to the tetrahydroampicillin in 5 minutes in a low pressure hydrogenation apparatus with 5 percent palladium on carbon (2.0 g.) as catalyst. After removal of the catalyst and adjustment of the pH to 5, the solution is freeze-dried to give tetrahydroampicillin, i.e., 6(D-2-amino-2(1-cyclohexene-1-yl)acetamido]penicillanic acid.

The sensitivities of the penicillin-resistant strains of *Neisseria gonorrhoeae* were determined by an agar dilution method in general accordance with a standardized procedure recommended by the Publich Health Service and published in PHS publication No. 499, (revised 1969). The mean sensitivity of the penicillins tested is reported on an active moiety basis in the following table:

Table

Mean Sensitivity of 23 strains of *Neisseria gonorrhoeae* to Various Penicillins

| Penicillin | Minimal Inhibitory Concentration ($\mu$g./ml.) | |
|---|---|---|
| | Penicillin-sensitive (11 strains) | Penicillin-resistant (12 strains) |
| Penicillin G | 0.0320 | 0.329 |
| Ampicillin | 0.0835 | 0.224 |
| Dihydroampicillin | 0.0514 | 0.203 |
| Tetrahydroampicillin | 0.1665 | 0.651 |

In all of the 23 strains of *Neisseria gonorrhoeae* tested which are summarized in the Table, dihydroampicillin exhibited a lower MIC value against each strain than tetrahydroampicillin tested against the same strain. The highest MIC value exhibited by dihydroampicillin was 0.244 $\mu$g./ml. The dihydroampicillin gave a lower MIC value against nine of the 23 strains in comparison with ampicillin against the same strain. Against one of the 23 strains, ampicillin gave a lower MIC value than dihydroampicillin.

In the treatment of Neisseria infections in human beings dihydroampicillin is administered parenterally, or orally. The dose to be administered is a variable of numerous factors including the severity of the condition being treated, size and age of the patient, whether the patient is available for maintenance dose treatment and the particular characteristics of the individual patient. Generally the compounds are administered in an amount from about 1 mg. to 75 mg. per kg./day and preferably in the range of 5 mg. to 30 mg./kg./day in a single dose. Formulation of suitable injectionable compositions may be made in the same manner as other penicillins including injectable forms of ampicillin. Examples of typical formulations are found in U.S. Pat. Nos. 2,745,785 and 3,144,145.

The compound of formula I has also been found effective against other Neisseria species such as *Neisseria catarrhalis*.

The dihydroampicillin may be used in combination with other therapeutic agents in a manner that will be obvious to those skilled in the art. For example, in the treatment of *Neisseria gonorrhoeae*, dihydroampicillin can be administered in conjunction with Probenecid (di-propylsulfamyl benzoic acid).

What is claimed is:

1. A method of treating Neisseria infections caused by a penicillin-resistant strain of Neisseria Gonorrhoeae in a human host afflicted with such an infection, which comprises administering to said human host an effective amount for treating said Neisseria infection of 6-[D-2-amino-2-(1,4-cyclohexanedien-1-yl)acetamido]penicillanic acid.

* * * * *